(12) United States Patent
Siegenthaler et al.

(10) Patent No.: US 8,256,279 B2
(45) Date of Patent: Sep. 4, 2012

(54) DEVICE FOR DETECTING A COMBUSTION CHAMBER PRESSURE OF AN INTERNAL COMBUSTION ENGINE

(75) Inventors: Petra Siegenthaler, Wutha-Farnroda (DE); Holger Scholzen, Stuttgart (DE); Christian Doering, Stuttgart (DE); Markus Ledermann, Salach (DE); Sven Zinober, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 12/785,947

(22) Filed: May 24, 2010

(65) Prior Publication Data
US 2010/0294028 A1 Nov. 25, 2010

(30) Foreign Application Priority Data

May 25, 2009 (DE) .......................... 10 2009 022 539

(51) Int. Cl.
*G01M 15/08* (2006.01)
(52) U.S. Cl. .................................. 73/114.16
(58) Field of Classification Search ................ 73/35.12, 73/35.13, 114.16, 114.18
See application file for complete search history.

(56) References Cited

U.S. PATENT DOCUMENTS

| | | | | |
|---|---|---|---|---|
| 5,126,617 A | * | 6/1992 | Lukasiewicz et al. | 310/338 |
| 5,377,547 A | * | 1/1995 | Kusakabe et al. | 73/723 |
| 5,537,883 A | * | 7/1996 | Okauchi et al. | 73/723 |
| 5,559,280 A | * | 9/1996 | Kovacich et al. | 73/35.13 |
| 5,583,295 A | * | 12/1996 | Nagase et al. | 73/708 |
| 5,777,239 A | * | 7/1998 | Fuglewicz | 73/862.68 |
| 7,159,448 B2 | * | 1/2007 | Moelkner et al. | 73/35.12 |
| 7,171,857 B2 | * | 2/2007 | Barron | 73/719 |
| 7,555,932 B2 | * | 7/2009 | Hirose et al. | 73/35.12 |
| 7,581,520 B2 | * | 9/2009 | Kern et al. | 123/145 A |
| 7,624,620 B2 | * | 12/2009 | Hirose et al. | 73/35.12 |
| 7,726,196 B2 | * | 6/2010 | Friedl | 73/721 |
| 7,954,382 B2 | * | 6/2011 | Kern et al. | 73/715 |
| 7,994,690 B2 | * | 8/2011 | Wolfer et al. | 310/338 |
| 2005/0150302 A1 | * | 7/2005 | Barron | 73/719 |
| 2008/0302323 A1 | * | 12/2008 | Kern et al. | 123/145 A |

FOREIGN PATENT DOCUMENTS

WO 2006/089446 8/2006

* cited by examiner

*Primary Examiner* — Freddie Kirkland, III
(74) *Attorney, Agent, or Firm* — Kenyon & Kenyon LLP

(57) ABSTRACT

A device for detecting a combustion chamber pressure of an internal combustion engine, in particular a gasoline engine. The device includes a sensor housing, the sensor housing being set up to be at least partially introduced into a combustion chamber of the internal combustion engine. At least one mechanical-electrical transducer element is accommodated inside the sensor housing, which is separated from the sensor housing by at least one sensor holder, in particular a sensor holder which at least partially encloses the mechanical-electrical transducer element. The sensor holder has an at least partially rigid design.

18 Claims, 2 Drawing Sheets

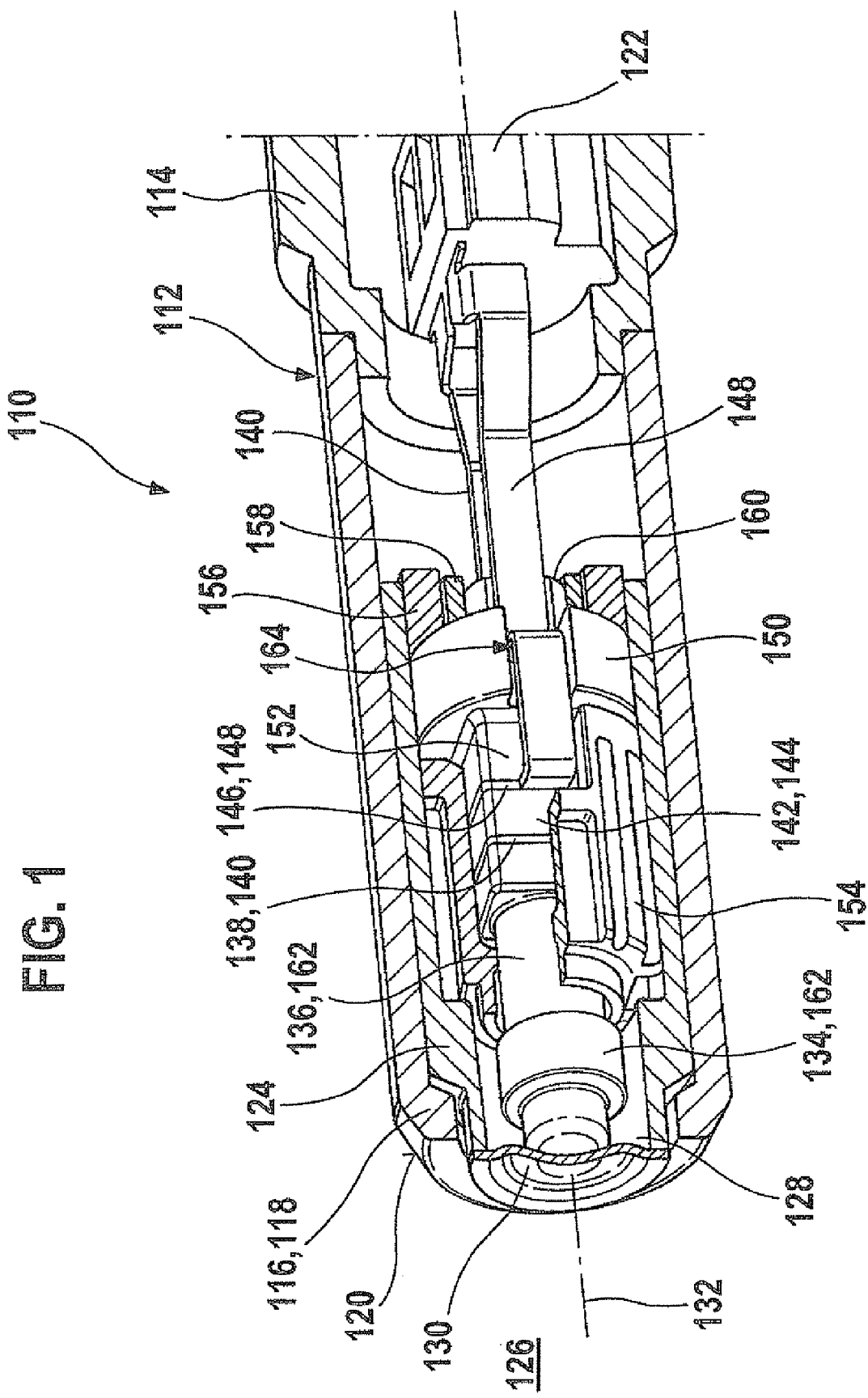

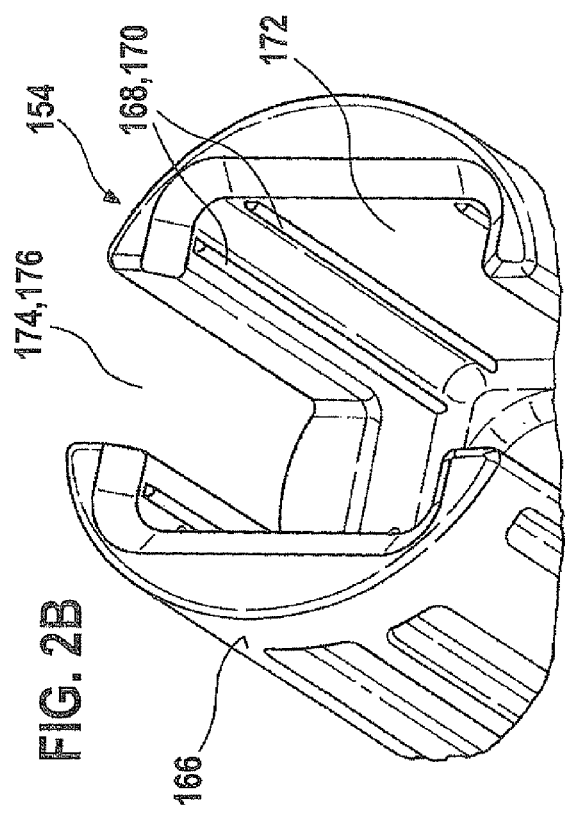
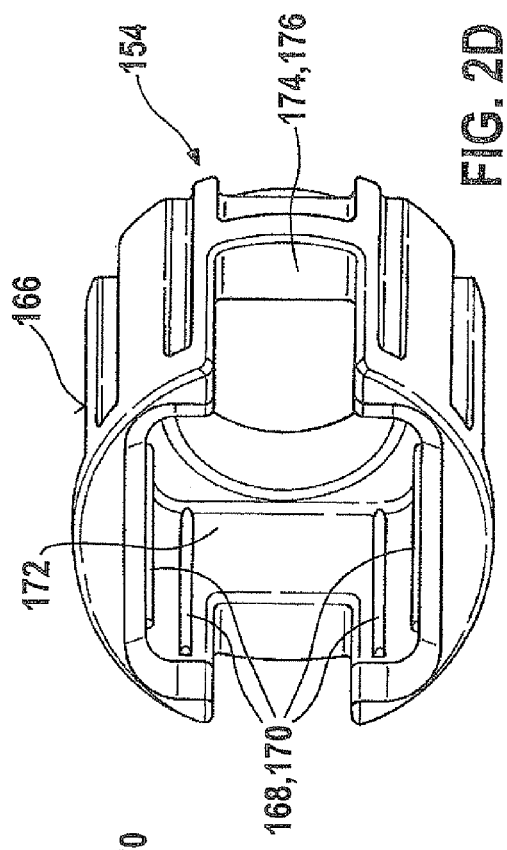
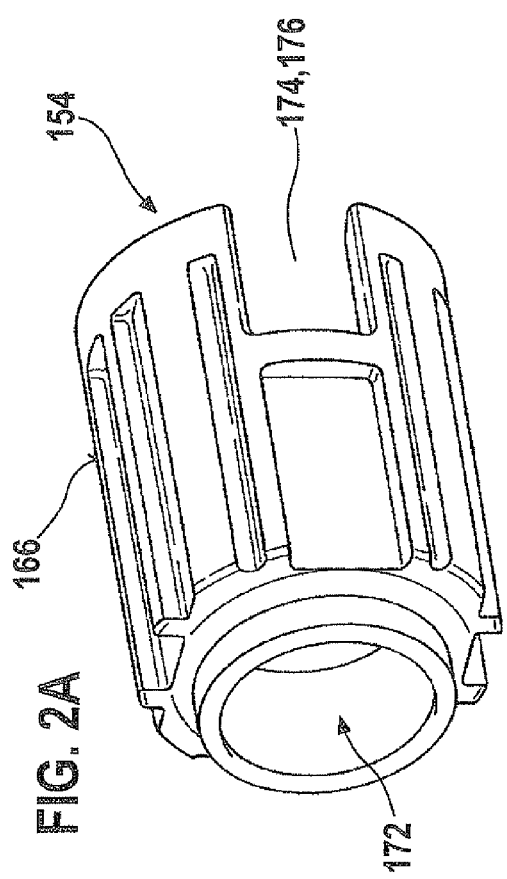
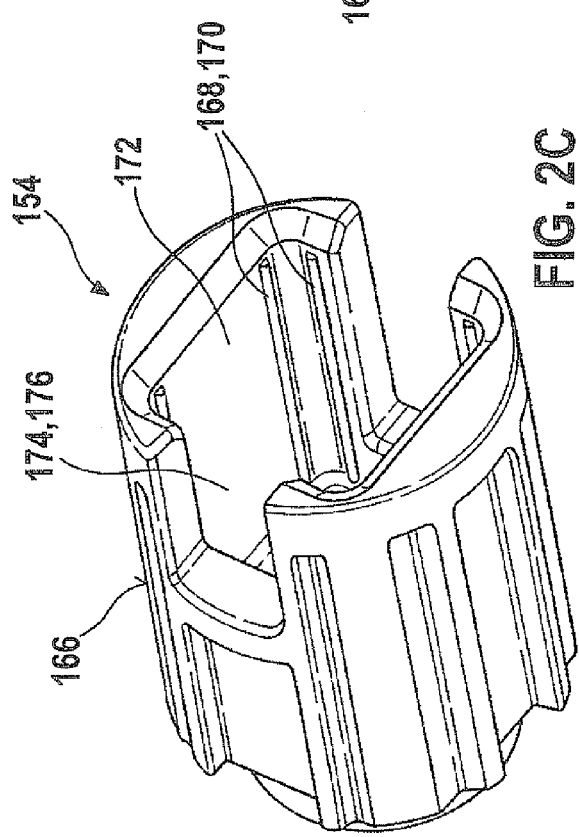

DEVICE FOR DETECTING A COMBUSTION CHAMBER PRESSURE OF AN INTERNAL COMBUSTION ENGINE

RELATED APPLICATION INFORMATION

The present application claims priority to and the benefit of German patent application no. 10 2009 022 539.0, which was filed in Germany on May 25, 2009, the disclosure of which is incorporated herein by reference.

FIELD OF THE INVENTION

The present invention relates to a device for detecting a combustion chamber pressure of an internal combustion engine, which is usable in particular in gasoline engines.

BACKGROUND INFORMATION

Devices of this type form an essential component of modern engine controllers, because the combustion chamber pressure must be detected very precisely, in particular for the purpose of reducing emissions. Devices are known from the related art, which have predominantly been developed for diesel engines.

Thus, for example, International patent application WO 2006/089446 A1 discusses a component for power or pressure sensors, in particular for installation in a glow plug. The component includes a measuring element in the form of a disc or perforated disc made of piezoelectric material and electrodes in the form of perforated discs or discs, which press against the measuring element on both sides, having contact points for the contact to lines. Furthermore, one or more transmission bodies situated on both sides outside the electrodes are provided. The described elements are held together by an external, electrically insulating film, for example shrink tubing, so that a sensor module is formed. The shrink tubing is used, on the one hand, for electrically insulating adjacent components and, on the other hand, for holding together the individual components of the sensor module, in particular during transport between individual manufacturing stations, until final assembly is performed.

During manufacturing of combustion chamber pressure sensors which are suitable for mass production, and which are usable as stand-alone combustion chamber pressure sensors, in particular for gasoline engines, known design and manufacturing concepts may cause technical difficulties, however. Thus, for example, the shrink tubing approach discussed in International patent application WO 2006/089446 A1 is predominantly suitable for cylindrical components. Square or polygonal piezo-quartzes may not be ideally fixed using this approach, however. Furthermore, in many cases assembly of a sensor module with subsequent transport is not necessary, because complete final assembly may be performed in one factory. Transport safety of the sensor module is thus no longer an issue in many cases, but rather recedes during manufacturing behind the comparatively complex handling steps in the event of the shrink tubing.

SUMMARY OF THE INVENTION

Therefore, a device for detecting a combustion chamber pressure of an internal combustion engine is proposed which meets these challenges. The device is also usable in particular in gasoline engines. The device includes at least one sensor housing, i.e., an element which entirely or partially encloses further components, such as a sensor housing designed at least partially in the form of a hollow cylinder, for example. The sensor housing may be made of a metallic material, for example, and is set up to be introduced at least partially into the combustion chamber of the internal combustion engine. For example, the sensor housing may be fixed directly or indirectly in a combustion chamber wall of the internal combustion engine, so that the sensor housing protrudes at least partially, for example, using its front end, into the combustion chamber of the internal combustion engine.

The sensor housing may have an opening, for example a circular or polygonal opening, which is closed by at least one diaphragm, on the combustion chamber side. A diaphragm may be understood, for example, as an element which is deformable or movable in at least one direction, which extends perpendicular to an axis of the sensor housing, for example, whose lateral extension may exceed its thickness by at least a factor of 10, in particular by at least a factor of 100. The diaphragm may be designed, for example, as a metal diaphragm, such as a metal film, and may also be designed in one piece with the sensor housing and/or may be joined non-positively and/or positively and/or integrally to the sensor housing in the area of the opening. It may particularly be preferable if the sensor housing has a hollow-cylindrical design at least in the area of the opening, the diaphragm, for example, being welded as a metal diaphragm, for example, on the sensor housing, on the edge of the sensor housing enclosing the opening. Another type of connection to the sensor housing is fundamentally possible, however, such as a non-positive connection, for example, by a cap nut. The diaphragm may close the opening completely pressure-tight, at least in the range of pressures typically occurring in combustion chambers.

Furthermore, the device includes at least one mechanical-electrical transducer element in the sensor housing. This is generally to be understood as an element which can convert mechanical actions, for example a force action and/or a pressure action and/or a length change in the transducer element, into electrical signals. Reference is essentially made hereafter to piezoelectric transducer elements. Alternatively or additionally, the mechanical-electrical transducer element may also, however, include other types of transducer elements which are set up to convert mechanical signals into electrical signals. Furthermore, the device may have at least one transmission element, which is implemented separately from the sensor housing, for transmitting a deformation of the diaphragm to the mechanical-electrical transducer element. In this way, for example, a deflection of the optional diaphragm due to the combustion chamber pressure may be transmitted via the transmission element to the mechanical-electrical transducer element, so that an electrical signal may be generated corresponding to the deflection of the diaphragm and thus corresponding to the combustion chamber pressure. A transmission element is to be understood fundamentally as an arbitrary element, using which movements and/or deformations of the diaphragm may also be axially transmitted, which may be essentially rigidly, to the mechanical-electrical transducer element. For example, the transmission element may have an essentially rod-shaped design and may be supported on an axis of the device. A one-piece or multipart design of the transmission element is possible.

As described above, the transmission element may be situated separately from the sensor housing. This means that the device may have at least two transmission paths, via which forces and/or length changes in components of the device, which are exposed directly to the combustion chamber, for example the diaphragm and/or a front side of the sensor housing facing toward the combustion chamber, may be transmitted to the mechanical-electrical transducer element. Thus, for example, the sensor housing itself may be a part of a first transmission path, and the transmission element may be part of a second transmission path, which is essentially not coupled to the first transmission path. For example, thermally caused expansions of the device may be transmitted via the first transmission path and the second transmission path to the mechanical-electrical transducer element, which may be essentially without coupling of the two paths. This is explained in greater detail hereafter. The first transmission path may concentrically enclose the second transmission path.

Because thermally caused expansions of the device are transmittable via both transmission paths to the mechanical-electrical transducer element, it may particularly be preferable if the device has at least one compensation body for compensating for different thermal expansions in the two transmission paths. It may particularly be preferable if the transmission element itself includes at least one compensation body, which is set up to compensate for differing thermal expansions between the first transmission path and the second transmission path. Thus, for example, the compensation body may be set up with respect to its length and its thermal expansion coefficients in such a way that it ensures, at least within typical temperature ranges to which the device may be exposed (for example −40° C. to 555° C.), that the thermal expansions of the first and the second transmission paths are at least largely identical, for example, within the scope of a tolerable deviation of not greater than 20%, in particular not greater than 10%, and particularly may be not greater than 5% or even 0%.

For example, in the event of a cold start, temperatures of −40° C. may briefly prevail. During operation, the described transmission path typically does not heat through homogeneously, but rather a temperature gradient will normally result from the combustion chamber, for example, at a diaphragm temperature of up to approximately 550° C., or to the mechanical-electrical transducer element, for example, at a temperature of the piezo-quartz of up to approximately 200° C. The temperature compensation may then be performed, for example, on the basis of empirically ascertained temperature gradients, for example, ascertained from engine measurements. A temperature compensation may typically only be designed either for homogeneous temperatures or for temperature gradients, in particular homogeneous temperature gradients. The temperature compensation may be performed in such a way that a pretensioning force, for example, a pretensioning force of the mechanical-electrical transducer element, does not change or only changes insignificantly upon the transition from an idle temperature gradient to a full load temperature gradient or vice versa. A change in the pretensioning force by changing the ambient temperature may normally be tolerated in this case, because typically a high time constant is provided and the influence of the measuring signal is usually negligible, in particular in connection with a reset of a measuring signal, for example, after each cycle. It may thus be ensured, for example, that over the typically occurring temperature range in which the device is used, a solely thermally caused transducer signal or a change in the transducer signal of the mechanical-electrical transducer due to differing expansions in the first transmission path and in the second transmission path occurs as little possible. As described above, however, this may also be alternatively or additionally achieved by situating the at least one compensation body at another location in one of the two transmission paths and/or by suitable material selection of the elements which participate in the transmission paths.

Alternatively or additionally to the at least one compensation body, the transmission element may also have at least one heat protection insulating body having thermally insulating properties. In this way, it may be ensured that high temperatures and/or large quantities of heat may not be transmitted via the transmission element from the combustion chamber to the mechanical-electrical transducer element, which could damage it. For example, the heat protection insulating body may include at least one ceramic material, which may have high thermally insulating properties. Other types of materials are also possible. The heat protection insulating body may thus also be constructed in multiple parts. Alternatively or additionally to thermal insulation, the heat protection insulating body may also have electrically insulating properties. This may be ensured in that the thermal protection insulating body having the thermally insulating properties also has electrically insulating properties itself. Alternatively, however, a multipart construction may also be provided, in which the heat protection insulating body has at least one electrically insulating component in addition to at least one thermally insulating component.

Furthermore, the device may include at least one contact element for electrical contacting of the mechanical-electrical transducer element. In particular, this may be a rigid contact element, i.e., a contact element which only changes its shape insignificantly or not at all under the effect of its intrinsic weight force. In particular, the contact element may include at least one busbar, i.e., a rigid element which has current-conducting properties, for example a metallic element. The contact element may be set up in such a way that it has at least partial axial flexibility, for example, sectionally, i.e., a flexibility in its longitudinal extension direction, for example, parallel to the axis of the device. This may be achieved, for example, in that the contact element is at least partially designed to have elastic properties. Alternatively or additionally, the contact element, for example the at least one busbar, may at least sectionally allow flexibility in the sensor longitudinal direction in that a double strand is provided. This may be performed similarly to corrugated cardboard, for example, in that a busbar is equipped with two external tracks, between which at least one elastic element is provided, for example a folded metal track. In this way, in particular in the area of a contact of the mechanical-electrical transducer element, axial flexibility of the contact element may be provided, for example, in that the contact element is designed in such a way, for example, bent, that it has one or more sections having an extension perpendicular to the axis. In this way or in another way, the one or more contact element(s) may contribute to a strain relief of the mechanical-electrical transducer element, so that, for example, a force action is possible on the mechanical-electrical transducer element, but a travel which is impressed by tensionings on the mechanical-electrical transducer element is reduced, for example. However, this travel is significant for an error signal generated by the tensionings in the mechanical-electrical transducer element, for example a piezo-quartz.

The mechanical-electrical transducer element may be directly or indirectly supported against an insulating body on its side facing away from the combustion chamber. This insulating body may have electrically insulating properties, for example. Furthermore, the mechanical-electrical transducer element may alternatively or additionally be supported directly or indirectly against the sensor housing via at least one fixing unit on its side facing away from the combustion chamber. The fixing unit may be a metal fixing unit, for example, such as a metal ring, which may be integrally and/or positively and/or non-positively joined to the sensor housing, for example. Welding of the fixing unit to the sensor housing may particularly be done. Other fixing units may also be used, however.

Furthermore, the device has at least one sensor holder. The mechanical-electrical transducer element is separated from the sensor housing by the at least one sensor holder. The sensor holder has an at least partially rigid design, i.e., from a material which deforms only insignificantly or not at all at least under the effect of its intrinsic weight force. The sensor holder is thus designed in particular as a dimensionally stable component, for example, as a dimensionally stable plastic component, in particular as a thermoplastic component. In particular, the sensor holder may have an incompressible design. The sensor holder may particularly have electrically insulating properties.

In particular, the sensor holder may be at least partially made of one or more of the following materials: a plastic, in particular a filled plastic, in particular a plastic having a glass-fiber reinforcement; a polyetherimide (PEI); a polyetheretherketone (PEEK); a ceramic; a polymer ceramic. The use of other materials is also fundamentally possible, however. The plastic, in particular the filled plastic, may include, for example, as noted, a polyetherimide and/or a polyetheretherketone, and/or also a polyamide and/or a polypropylene and/or a polyphenylene sulfide (PPS). Alternatively or additionally to a glass-fiber filling, other fillers may also be used, for example carbon fibers and/or ceramics or similar materials.

In particular, the sensor holder may also be designed as a sensor holder which at least partially encompasses, in particular encloses, the mechanical-electrical transducer element, for example, a sensor holder which concentrically encloses this transducer element. The mechanical-electrical transducer element may in particular have a polygonal cross section, in particular a square cross section, the sensor housing being able to have an inner chamber having a round cross section, in particular a circular cross section. In this way, the sensor holder may be used as a geometrical adapter, for example, in order to hold a polygonal mechanical-electrical transducer element securely, reliably, and with little play inside the sensor housing. The sensor holder may be at least partially designed as a sleeve, for example. The sensor holder may have an external diameter of less than 8 mm and which may be less than 4.5 mm, for example. The sensor holder, as noted above, may have thermally and/or electrically insulating properties, for example, and/or vibration-damping properties.

The sensor holder may also at least partially enclose at least a part of the transmission element, for example the heat protection insulating body and/or the compensation body. Alternatively or additionally, the sensor holder may also entirely or partially enclose the insulating body. In this way, the two above-described transmission paths may be additionally separated from one another. The sensor holder itself should not have any direct contact with the diaphragm, so that the sensor holder itself does not form a component of the above-mentioned transmission paths. Alternatively or additionally, the sensor holder may enclose further elements of the device, in particular further elements which form part of the second transmission path. The sensor holder may thus at least partially enclose elements, for example the insulating body, on the side of the mechanical-electrical transducer element facing away from the combustion chamber.

Furthermore, the sensor holder may have at least one, and may have two, three, four, or more axial guide elements in its inner and/or on its outer surface pointing toward the sensor housing. Axial guide elements are generally to be understood as spacers which extend in the axial direction. In particular, these may be elements which are set up in order to hold and/or guide the element or elements enclosed by the sensor holder at a distance from an inner wall of the sensor holder and reduce friction losses in this way. Alternatively or additionally, the axial guide elements may also include one or more elements which are set up in order to hold and/or guide the external surface of the sensor holder facing toward the sensor housing at a distance from the inner wall of the sensor housing and to reduce friction losses in this way. For example, the sensor holder may have, as the at least one axial guide element, at least one axially running rib for friction reduction. The goal of these measures may be minimization of friction to the first transmission path and/or to the second transmission path, i.e., for example, minimization of friction to an external force path and/or minimization of a friction to an internal force path. This at least one rib may extend over the entire length of the sensor holder or over only a part of the sensor holder, for example.

In this way, in particular components of the second transmission path described above may be guided inside the sensor holder with reduced friction. In particular, as described above, the transmission element (in particular the compensation body and/or the heat protection insulating body) and/or the first busbar and/or the mechanical and electrical transducer element (in particular the piezo-quartz) and/or the second busbar and/or the insulating body may be entirely or partially guided inside the sensor holder using the at least one axial guide element. The sensor holder may, notwithstanding an optional external cylindrical surface, be adapted by its geometrical design in particular in such a way that it may optimally receive the elements which the sensor holder encloses entirely or partially. Thus, in particular, an inner chamber of the sensor holder may be geometrically adapted to the external dimensions of the enclosed elements, optionally with required play added. If the device, as described above, includes at least one contact element for electrical contacting of the mechanical-electrical transducer element, in particular at least one busbar, the sensor element may also entirely or partially enclose this contact element. In this case, the sensor holder may have at least one recess, for example an axially running recess, for receiving and/or guiding the contact element. This recess may, for example, be at least one slot, for example a lateral slot. The device may further include at least one sealing housing which at least partially encloses the sensor housing, for example a sealing cone housing. This sealing housing may be set up to allow fixing of the device in a combustion chamber wall, so that at least a pressure on the combustion chamber side may be applied to the diaphragm.

The proposed device has numerous advantages with respect to known devices in one or more of the above-described specific embodiments, which are positively noticeable in particular when used in gasoline engines. The device is thus designed in such a way that the high temperatures occurring during combustion in the combustion chamber may influence the signals only insignificantly or not at all. The pressure signal from the combustion chamber may be relayed within the device into an area in which temperatures compatible with the mechanical-electrical transducer element prevail. The proposed construction additionally allows a measuring signal transmission with minimal signal reduction and/or signal change. Furthermore, external mechanical influences, for example the screwing-in torque, are kept away from the second transmission path, i.e., from the transmission path of the pressure, the force, and the electrical signal.

Through the proposed second transmission path, which may be used as a relevant force path and whose transmission is received by the mechanical-electrical transducer element, the pressure signal may be converted with low losses into a force, relayed to the measuring element, and converted into an electrical signal therein, which is in turn guided to an analysis circuit—integrated in the device itself and/or situated entirely or partially outside the device. The mechanical-electrical transducer element and/or the analysis element may be situated in areas having compatible temperatures. Furthermore, the above-described components of the device may be optimized in such a way that the measuring signal is not impaired by mechanical and/or thermal influences. Thus, in particular temperature influences and/or mechanical influences which may occur due to the busbars, for example, may be minimized by the above-described embodiment according to the present invention.

Using the proposed device, in particular an efficient alternative to the known shrink tubing approaches for holding the sensor module may be provided. Using a specially profiled sensor holder, for example a specially profiled plastic body, instead of the shrink tubing, in particular the assembly of the sensor module, which may also enclose parts of the transmission element and/or the insulating body in addition to the mechanical-electrical transducer element, may be made easier. In addition, a square or polygonal piezo-quartz may be manufactured more cost-effectively than a cylindrical one, the assembly of square piezo-quartzes in a round sensor housing being made possible using the prefinished sensor holder. Furthermore, pre-assembly of a sensor module at a supplier is not necessary, and the entire assembly may be performed in one final assembly factory.

In this way, transport safety of the sensor module may be dispensed with as a requirement, because it may now be necessary to provide a single component, which holds the adjacent components in the intended location during operation, and no longer during the transport of the sensor module. The design of the sensor holder is comparatively free. In particular, a design as a plastic component, for example, as an injection-molded plastic component, is relatively free in its design, so that the sensor holder allows, for example, the transition from a square piezo-quartz and/or another mechanical-electrical transducer element to a round sensor housing in the radial direction, for example. On the other hand, a transition from a square and/or polygonal mechanical-electrical transducer element to a differently designed body may also be made possible in the axial direction, for example, to surrounding insulating bodies and/or transmission elements, which may have a round design, for example.

Using the at least one axial guide element, for example the rib, low-friction guiding of the second transmission path in the sensor holder and thus minimization of hysteresis may be ensured. In this way, minimization of hysteresis errors may in turn be achieved. Furthermore, effective electrical insulation of the mechanical-electrical transducer element, for example the piezo-quartz, and optionally the components which conduct the sensor signal (for example the busbars) from the external housing may be ensured.

Exemplary embodiments of the present invention are shown in the drawings and are described in greater detail in the following description.

BRIEF DESCRIPTION OF THE DRAWINGS

FIG. 1 shows an exemplary embodiment of a device according to the present invention for detecting a combustion chamber pressure of an internal combustion engine.

FIG. 2A shows a perspective illustration of an exemplary embodiment of a sensor holder.

FIG. 2B shows another perspective illustration of an exemplary embodiment of a sensor holder.

FIG. 2C shows another perspective illustration of an exemplary embodiment of a sensor holder.

FIG. 2D shows another perspective illustration of an exemplary embodiment of a sensor holder.

DETAILED DESCRIPTION

FIG. 1 shows an exemplary embodiment of a device 110 according to the present invention for detecting a combustion chamber pressure of an internal combustion engine, which may be used in particular in a gasoline engine. Device 110 includes a housing 112 constructed in multiple parts, having a main body 114 and a sealing housing 118, designed as a sealing cone housing 116, having a sealing cone 120 on the combustion chamber side. Main body 114, which may be made of a plastic material and/or a ceramic material, for example, receives a contact module 122. Signals of device 110 may already be entirely or partially processed in this contact module 122 and/or relayed outward via one or more interfaces (not shown in FIG. 1). Sealing housing 118, which has an essentially cylindrical design, and which in turn concentrically encloses a sensor housing 124, is placed on the main body. This sensor housing 124 has an opening 128, which is closed by a diaphragm 130, on its side facing toward a combustion chamber 126. This diaphragm 130 is set up to deform or bend in a direction of an axis 132 of device 110 upon actions of a pressure from combustion chamber 126.

A compensation body 134 is attached to diaphragm 130 in the interior of sensor housing 124 along axis 132. This is in turn adjoined in the axial direction by a heat protection insulating body 136, which opens on a first contact area extending essentially perpendicular to axis 132 of a first busbar 140, which otherwise extends essentially parallel to axis 132. A mechanical-electrical transducer element 142 in the form of a piezo-quartz 144 adjoins this busbar. The side of piezo-quartz 144 facing away from combustion chamber 126 is adjoined in the axial direction by a second contact area 146, which is implemented as a section extending essentially perpendicular to axis 132 of a second busbar 148, which otherwise may extend essentially parallel to axis 132. Both contact areas 138 and 146 form contacts and/or electrodes of piezo-quartz 144. Alternatively, electrodes of piezo-quartz 144 may also be designed in another way and/or as components separate from busbars 140, 148.

An insulating body 150 adjoins second contact area 146 in the axial direction on the side of piezo-quartz 144 facing away from combustion chamber 126. Insulating body 150 has a section 152 on the combustion chamber side having a reduced diameter, which is enclosed, together with piezo-quartz 144 and heat protection insulating body 136, by a sensor holder 154. A fixing unit 156 in the form of a metal ring adjoins the insulating body in the axial direction on the side facing away from combustion chamber 126. This metal ring may be welded to sensor housing 124, for example, as described in greater detail below. The metal ring of fixing unit 156 in turn encloses an insulating sleeve 158 in the exemplary embodiment shown, via which fixing unit 156 is separated from an extension 160 of insulating body 150.

Device 110, which is designed as a combustion chamber pressure sensor, protrudes on the diaphragm side into combustion chamber 126 of the internal combustion engine. The pressure applied in the combustion chamber is converted into a force inside diaphragm 130, which acts on compensation body 134. Compensation body 134 has the function, on the one hand, of relaying the force to heat protection insulating body 136, which forms a transmission element 162 together with compensation body 134. On the other hand, compensation body 134 has the function of compensating for differing thermal expansions of adjacent components. Piezo-quartz 144 is part of a structure which has two parallel transmission paths. A first transmission path may include diaphragm 130, sensor housing 124, and fixing unit 156. A second transmission path may include diaphragm 130, compensation body 134, heat protection insulating body 136, first busbar 140 or its first contact area 136, piezo-quartz 144, second busbar 148 or its second contact area 146, insulating body 150, and fixing unit 156.

The inner, second transmission path expands differently than the outer, second transmission path enclosing it because of differing thermal expansion coefficients of these components. These differing expansions finally result in additional loading or relief of piezo-quartz 144, which is superimposed with the force action resulting from the combustion chamber pressure and typically may not be differentiated therefrom.

This superposition thus typically results in a measuring error. It is therefore proposed according to the exemplary embodiments and/or the exemplary methods of the present invention that the differing expansions be suppressed in that compensation body 134 may be configured with respect to its length and/or its coefficient of thermal expansion in such a way that it ensures that the thermal expansions of the inner and the outer transmission paths are identical. However, this expansion is only possible for a specific temperature or a specific temperature gradient in many cases. Nonetheless, using a suitable material selection of compensation body 134, at least a minimization of expansion errors as a result of differing thermal expansions in the transmission paths may be achieved at least in the relevant temperature range of device 110.

Heat protection insulating body 136 has the function, on the one hand, of interrupting the thermal path from combustion chamber 126 to piezo-quartz 144, i.e., protecting piezo-quartz 144 from overheating. On the other hand, it may also be used as an electrical insulator, which ensures that the electrical charges transmitted from piezo-quartz 144 to busbars 140, 148 are only relayed on the route provided for them via busbars 140, 148 themselves. Depending on the concrete requirements for the electrical insulation and/or the thermal insulation, it may be advisable or necessary to design heat protection insulating body 136 in multiple parts, and to divide it into a thermally insulating component and an electrically insulating component, for example, whose materials may then be optimized for the corresponding requirements.

Piezo-quartz 144 is made of piezoelectric material and converts a force, the force resulting from the combustion chamber pressure signal here, into an electrical charge, which is proportional to the applied force, i.e., to the applied pressure here. Piezo-quartz 144 converts the force via the detour of a length change into an electrical charge. The electrical charge is converted into a voltage proportional to the charge and/or the force and/or the pressure, which may then be relayed to an engine control unit, in an analysis circuit (not shown in FIG. 1), for example, which may be entirely or partially accommodated in contact module 122, but which may alternatively or additionally also be entirely or partially accommodated outside device 110.

Busbars 140, 148 each have essentially the same functions. On the one hand, they transmit the charges which are generated in piezo-quartz 144 to the analysis circuit. Because a force action, which may in turn generate an error-relevant measuring signal, may also arise on piezo-quartz 144 by tensionings in busbars 140, 148 themselves, which may arise through thermal expansions or through internal mechanical stresses after the welding of the busbars to the other components in the rear part of device 110 facing away from combustion chamber 126, the busbars may have a tension relief function. The busbars may accordingly have a double strand, in particular in the area between insulating body 150 and fixing unit 156, which allows a certain flexibility in the sensor longitudinal direction, i.e., along axis 132. For this purpose, busbars 140, 148 may be designed like corrugated cardboard, as described above. Alternatively or additionally, as indicated in FIG. 1, busbars 140, 148 may also have one or more folds and/or bends, which are used as spring elements and may ensure the described tension relief. Busbars 140, 148 may also be elastic in another way, i.e., have an elastic action in the direction of axis 132. The force action of tensionings on piezo-quartz 144 is not reduced by the described flexibility, but the impressed travel is reduced. The impressed travel, i.e., the change in piezo-quartz 144, is decisive for the generated error signal in piezo-quartz 144.

Insulating body 150, which may be made of a ceramic material and/or a plastic material, for example, has the main function of electrically insulating piezo-quartz 144 and one or both of busbars 140, 148, for example second bulbar 148, from adjacent components. Furthermore, insulating body 150 offers space for busbars 140, 148, so that they may be guided to the analysis circuit. In particular, insulating body 150 may also offer space for tension relief strands 164 and/or other types of spring elements of busbars 140, 148, in order to achieve the tension relief action described above. Fixing unit 156, which is configured as a metal fixing unit, for example, is used as a buttress for the previously described second transmission path, i.e., the inner force path. It may be welded to sensor housing 124 in the first transmission path, i.e., the outer force path. The welding may be performed under application of a pre-stress, for example, which may be necessary so that all components rest securely and solidly on one another in every operating state. In addition, a pre-stress of this type may be necessary for the mode of operation of piezo-quartz 144. Insulating sleeve 158 is used for the purpose of avoiding an electrical short-circuit between busbars 140, 148 and fixing unit 156, also under high mechanical loads during use of device 110, e.g., mechanical shocks.

The first transmission path, i.e., the outer force path, also begins with above-described diaphragm 130, which may be welded onto sensor housing 124 in the area of opening 128, for example. Sensor housing 124 is used as a carrier of the components of the second transmission path, i.e., the inner force path, and for the purpose of protecting them from external mechanical influences. The rear end of sensor housing 124 may be welded to fixing unit 156, as described above. Sensor holder 154 is situated between sensor housing 124 and the inner force path. This sensor holder may be entirely or partially made of plastic, ceramic, polyceramic, or similar material, for example, as a one-piece, sleeve-shaped part, for example. Furthermore, it may be set up for the purpose of orienting, receiving, and electrically insulating piezo-quartz 144, busbars 140, 148, heat protection insulating body 136, and insulating body 150 in relation to sensor housing 124. Sensor housing 124 encloses the inner force path and forms an independent assembly which contains the entire sensor function and may theoretically function as a separate sensor, because diaphragm 130 and fixing unit 156 are welded to sensor housing 124, in cooperation with the inner and the outer force paths. This sensor functional assembly is still accommodated in sealing housing 118 in this exemplary embodiment, for example, welded into sealing cone housing 116. A structure may thus be achieved which may be screwed by a user into a cylinder head. High torques (screwing torques) and high axial pre-stresses arise as it is screwed in. These axial pre-stresses could induce measuring errors if they acted on the sensor functional assembly. The sensor functional assembly is therefore only peripherally welded into sealing cone housing 116 at one point. A transmission of axial pre-stress forces or torques to the sensor functional assembly may therefore be largely prevented. The tightness of the sensor inner chamber is simultaneously also implemented by the welding of the sensor functional assembly to sealing cone housing 116.

An example of a sensor holder 154, which may be used in device 110 according to FIG. 1, for example, is shown in various perspective views in FIGS. 2A through 2D. Sensor holder 154 has an essentially cylindrical shape on the outside, including an essentially circular-cylindrical surface 166. Sensor holder 154 may be made of a plastic; however, ceramics and/or polymer ceramics may also be used alternatively or additionally, as described above. A component made of plastic may be designed relatively freely. This circumstance may be exploited in order to form a component which may allow the transition between a square piezo-quartz 144 to a cylindrical sensor housing 124 using its geometry in the radial direction. Sensor housing 124 may have a cylindrical design, because this shape is the most cost-effective to manufacture. Piezo-quartz 144 is in turn most cost-effective if it has a square and/or polygonal design. A plastic component may always be manufactured cost-effectively, independently of its concrete geometry. Sensor holder 154 made of plastic is thus an ideal component, which makes it possible for it and adjacent components to be manufactured cost-effectively without functional restriction.

For the same above-described reasons, sensor holder 154 also allows the transition from piezo-quartz 144 to the elements situated in front of and/or behind it in the axial direction, such as heat protection insulating body 136 and/or insulating body 150, for example, which may be made entirely or partially of ceramic and which may also be entirely or partially enclosed by sensor holder 154. These elements may be components which may perform the actual transition from polygonal to round themselves, because ceramic components, similarly to plastics, may typically be designed relatively freely, although with restrictions in comparison to plastic. However, these components may be guided entirely or partially by sensor holder 154 itself, so that this sensor holder 154 may also support the transition from polygonal to round in the axial direction. In order to avoid or at least reduce hysteresis errors in the sensor, in the ideal case, the components of the second transmission path, i.e., the sensor force path, i.e., for example, diaphragm 130, compensation body 134, heat protection insulating body 136, first busbar 140, piezo-quartz 144, second busbar 148, insulating body 150, and fixing unit 156, should not contact the adjacent components in the radial direction or should contact them with the smallest possible contact surface. Contact causes friction, and a friction of this type may cause hysteresis.

The hysteresis in turn causes measuring errors. Because sensor holder 154 may also have the function of guiding the force travel components, and this may only be implemented with a certain amount of contact, the extent of the contact is to be minimized. For this purpose, in the exemplary embodiment in FIGS. 2A through 2D, axial guide elements 168 in the form of ribs 170 are provided. In the exemplary embodiment shown, eight ribs 170 of this type are provided, which extend in the interior of an opening 172 in the radial direction. These small ribs 170 may ensure that for the case in which contact is unavoidable, it is only minimal and is not over a large area. Ribs 170 should be provided on the inner side of sensor holder 154, i.e., the side facing toward piezo-quartz 144. Depending on the assembly concept, these axial guide elements 168 may also, however, alternatively or additionally be situated on outer surface 166 pointing toward sensor housing 124.

A further function of sensor holder 154 may include the electrical insulation of piezo-quartz 144 and busbars 140, 148 in relation to sensor housing 124. Sensor holder 154 may fulfill this function well innately in particular as a plastic component. Experience has shown, however, that particularly high demands are placed on the electrical insulation capability for a pressure measuring concept which is based on a piezo-quartz 144. Therefore, for example, a polyetherimide, optionally having a glass-fiber reinforcement, may be proposed, because this material is distinguished by a particularly high electrical insulation capability, which drops only slightly even at high humidity and high temperatures. Alternatively, for example, PEEK is also conceivable, but is less favorable from cost aspects.

In the exemplary embodiment shown in FIGS. 2A through 2D, sensor holder 154 may further include one or more recesses 174 in the present exemplary embodiment, which are designed here as lateral slots 176 for receiving busbars 140, 148. Through these two slots 176, it is possible to lead busbars 140, 148 away from piezo-quartz 144, without additional radial installation space being required. The wall thickness of sensor holder 154 may be adapted to the geometry of busbars 140, 148 (and optionally vice versa), in such a way that, on the one hand, as described above, no additional radial space is required, but, on the other hand, busbars 140, 148 may also be prevented from protruding beyond the external contour of sensor holder 154, also in consideration of the tolerances. In this way, a short-circuit between busbars 140, 148 and sensor housing 124 may be prevented. Sensor holder 154 may have an external diameter of less than 4.5 mm.

What is claimed is:

1. A device for detecting a combustion chamber pressure of an internal combustion engine, comprising:
   at least one mechanical-electrical transducer element;
   at least one sensor holder; and
   a sensor housing,
   wherein the sensor housing is set up to be introduced at least partially into a combustion chamber of the internal combustion engine,
   wherein the at least one mechanical-electrical transducer element is accommodated inside the sensor holder, the sensor holder being accommodated inside the sensor housing, and the sensor holder is axially movable relative to the sensor housing,
   wherein the mechanical-electrical transducer element is separated from the sensor housing by the at least one sensor holder, and
   wherein the sensor holder has an at least partially rigid configuration.

2. The device of claim 1, wherein the sensor holder has electrically insulating properties.

3. The device of claim 1, wherein the sensor holder is at least partially made of at least one of the following materials: a plastic; a polyetherimide; a polyetheretherketone; a polyphenylene sulfide; a ceramic; and a polymer ceramic.

4. The device of claim 1, wherein the sensor holder has an external diameter of less than 8 mm.

5. The device of claim 1, wherein the mechanical-electrical transducer element has a polygonal cross-section, and the sensor housing has an inner chamber having a round cross section.

6. The device of claim 1, further comprising:
- at least one transmission element, which is implemented separately from the sensor housing, for transmitting a deformation of at least one diaphragm to the mechanical-electrical transducer element,
- wherein the sensor housing has an opening on the combustion chamber side which is closed by the at least one diaphragm, and
- wherein the sensor holder at least partially encloses the transmission element.

7. The device of claim 6, wherein the sensor housing is part of a first transmission path, wherein the transmission element is part of a second transmission path, wherein thermally caused expansions of the device are transmittable to the mechanical-electrical transducer element via the first transmission path and the second transmission path, wherein the transmission element includes at least one compensation body, and wherein the compensation body is set up to at least largely compensate for differing thermal expansions between the first transmission path and the second transmission path.

8. The device of claim 1, wherein the sensor holder has at least one axial guide element in its interior for friction reduction.

9. The device of claim 1, wherein the sensor holder has at least one axial guide element for friction reduction on its surface pointing toward the sensor housing.

10. The device of claim 1, further comprising:
- at least one contact element for electrically contacting the mechanical-electrical transducer element,
- wherein the sensor holder has at least one recess for at least one of receiving and guiding the contact element.

11. The device of claim 1, wherein the mechanical-electrical transducer element is supported one of directly and indirectly against an insulating body on its side facing away from the combustion chamber, wherein the insulating body has at least electrically insulating properties, and wherein the insulating body is at least partially enclosed by the sensor holder.

12. The device of claim 1, wherein the sensor holder at least partially encloses the mechanical-electrical transducer element.

13. The device of claim 3, wherein the plastic includes one of a filled plastic, and a plastic having a glass-fiber reinforcement.

14. The device of claim 1, wherein the sensor holder has an external diameter of less than 4.5 mm.

15. The device of claim 1, wherein the mechanical-electrical transducer element has a polygonal cross-section, which is a square cross-section, and the sensor housing has an inner chamber having a round cross-section, which is a circular cross-section.

16. The device of claim 1, wherein the sensor holder has at least one axial guide element in its interior, which includes at least one axially running rib, for friction reduction.

17. The device of claim 1, wherein the sensor holder has at least one axial guide element, which includes at least one axially running rib, for friction reduction on its surface pointing toward the sensor housing.

18. The device of claim 1, further comprising:
- at least one contact element for electrically contacting the mechanical-electrical transducer element, which includes at least one busbar,
- wherein the sensor holder has at least one recess for at least one of receiving and guiding the contact element, which includes at least one lateral slot.

* * * * *